United States Patent
Zhang et al.

(10) Patent No.: US 8,243,868 B2
(45) Date of Patent: Aug. 14, 2012

(54) METHOD AND APPARATUS FOR DUTY CYCLE PRE-DISTORTION AND TWO-DIMENSIONAL MODULATION

(75) Inventors: Geoffrey Zhang, Allentown, PA (US); Xingdong Dai, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 1051 days.

(21) Appl. No.: 12/006,180

(22) Filed: Dec. 31, 2007

(65) Prior Publication Data

US 2009/0168941 A1 Jul. 2, 2009

(51) Int. Cl.
*H04L 7/00* (2006.01)
(52) U.S. Cl. ........................................................ 375/371
(58) Field of Classification Search .................. 375/238, 375/268, 269, 295, 300, 320, 353; 370/212, 370/533; 348/471; 359/264; 332/109
See application file for complete search history.

(56) References Cited

U.S. PATENT DOCUMENTS

| | | | | |
|---|---|---|---|---|
| 6,151,149 A | * | 11/2000 | Rybicki et al. | 398/191 |
| 6,184,916 B1 | * | 2/2001 | Cianciosi | 347/255 |
| 6,794,931 B2 | * | 9/2004 | Kenington | 330/10 |
| 6,819,512 B2 | * | 11/2004 | Kirby | 360/29 |
| 7,075,996 B2 | * | 7/2006 | Simon et al. | 375/259 |

OTHER PUBLICATIONS

U.S. Appl. No. 11/968,942, Dai, et al.
U.S. Appl. No. 11/935,759, Dai, et al.

* cited by examiner

*Primary Examiner* — Khanh C Tran

(57) ABSTRACT

In serial communications, jitter is an unwanted variation of one or more signal characteristics. Two-dimensional modulation circuits and methods incorporate an amplitude pre-emphasis scheme as well as a transmit duty cycle pre-distortion (pre-DCD) technique to reduce jitter. The pre-DCD technique directly addresses transition edges of the data signal and is combined with amplitude pre-emphasis to improved data transmission.

22 Claims, 12 Drawing Sheets

FIG. 5

L1 GROUP TABLE

| D(n-1) | D(n) | tL1 pre-DCD | tL1 DCD |
|--------|------|-------------|---------|
| 0 | 0 | 0 | 0 |
| 0 | 1 | trL1 | -trL1 |
| 1 | 0 | tfL1 | -tfL1 |
| 1 | 1 | 0 | 0 |

FIG. 6

L2 GROUP TABLE

| D(n-2) | D(n-1) | D(n) | tL2 pre-DCD | tL2 DCD |
|--------|--------|------|-------------|---------|
| 0 | 0 | 0 | 0 | 0 |
| 0 | 0 | 1 | trL2 | -trL2 |
| 0 | 1 | 0 | 0 | 0 |
| 0 | 1 | 1 | 0 | 0 |
| 1 | 0 | 0 | 0 | 0 |
| 1 | 0 | 1 | 0 | 0 |
| 1 | 1 | 0 | tfL2 | -tfL2 |
| 1 | 1 | 1 | 0 | 0 |

FIG. 7

T1 GROUP TABLE

| D(n) | D(n+1) | tT1 pre-DCD | tT1 DCD |
|---|---|---|---|
| 0 | 0 | 0 | 0 |
| 0 | 1 | trT1 | −trT1 |
| 1 | 0 | tfT1 | −tfT1 |
| 1 | 1 | 0 | 0 |

FIG. 8

T2 GROUP TABLE

| D(n) | D(n+1) | D(n+2) | tT2 pre-DCD | tT2 DCD |
|---|---|---|---|---|
| 0 | 0 | 0 | 0 | 0 |
| 0 | 0 | 1 | 0 | 0 |
| 0 | 1 | 0 | 0 | 0 |
| 0 | 1 | 1 | trT2 | −trT2 |
| 1 | 0 | 0 | tfT2 | −tfT2 |
| 1 | 0 | 1 | 0 | 0 |
| 1 | 1 | 0 | 0 | 0 |
| 1 | 1 | 1 | 0 | 0 |

FIG. 9

LT1 GROUP TABLE

| D(n-1) | D(n) | t1 pre-DCD | t1 DCD |
|---|---|---|---|
| 0 | 0 | 0 | 0 |
| 0 | 1 | trL1-trT1 | -(trL1-trT1) |
| 1 | 0 | tfL1-tfT1 | -(tfL1-tfT1) |
| 1 | 1 | 0 | 0 |

FIG. 10

LT2 GROUP TABLE

| D(n-1) | D(n) | D(n+1) | tL2 pre-DCD | tL2 DCD | tT2 pre-DCD | tT2 DCD |
|---|---|---|---|---|---|---|
| 0 | 0 | 0 | 0 | 0 | 0 | 0 |
| 0 | 0 | 1 | trL2 | -trL2 | 0 | 0 |
| 0 | 1 | 0 | 0 | 0 | 0 | 0 |
| 0 | 1 | 1 | 0 | 0 | trT2 | -trT2 |
| 1 | 0 | 0 | 0 | 0 | tfT2 | -tfT2 |
| 1 | 0 | 1 | 0 | 0 | 0 | 0 |
| 1 | 1 | 0 | tfL2 | -tfL2 | 0 | 0 |
| 1 | 1 | 1 | 0 | 0 | 0 | 0 |

METHOD AND APPARATUS FOR DUTY CYCLE PRE-DISTORTION AND TWO-DIMENSIONAL MODULATION

FIELD OF THE INVENTION

The present invention relates generally to transmitter improvement and more particularly to duty cycle pre-distortion and two-dimensional modulation.

BACKGROUND OF THE INVENTION

In most modern communications protocols (e.g., in telecommunications), data is sent one bit at one time, sequentially, over a communications channel or computer bus as serial communications. In serial communications, jitter is an unwanted variation of one or more signal characteristics. Jitter may be seen in characteristics such as the interval between successive pulses, or the amplitude, frequency, or phase of successive cycles. Jitter is a significant factor in the design of almost all communications links (e.g., USB, PCI-e, SAS/SATA, XAUI, Infiniband, SONET/SDH, FC, etc.). Jitter is found in a number of signal characteristics (e.g., amplitude, phase, pulse width, or pulse position), and can be quantified in the same terms as all time-varying signals (e.g., root mean square (RMS), peak-to-peak displacement, etc.).

Total jitter (TJ) is generally a specification of serial link standards and is used as a figure of merit when comparing serializer and deserializer (SerDes) devices. TJ comprises data dependent jitter (DDJ). In turn, DDJ comprises inter-symbol interference (ISI) and duty cycle distortion (DCD). Both ISI and DCD affect the amplitude and the phase (e.g., the location of the pulse edge) of a data signal. Left uncompensated, DDJ will cause errors in the received data.

ISI is a form of distortion of a signal that causes both the previously transmitted symbols and the succeeding symbols to have an effect on the currently received symbol. In a digital transmission system, such distortion of the received signal is manifested in the temporal spreading and consequent overlap of individual pulses to the degree that the receiver cannot reliably distinguish between changes of state (e.g., between individual signal elements). ISI is usually an undesirable phenomenon as the surrounding symbols have a similar effect to noise, thus making the communication less reliable. ISI will compromise the integrity of the received data. ISI is usually introduced by bandwidth limited physical media to which a SerDes device is connected and is caused by echoes or non-linear frequency response of the channel.

ISI may be measured by data eye patterns. That is, the relative magnitude of ISI may be viewed by examining the data eye. In this context, the data eye is a pattern generated on an oscilloscope which is triggered by the data clock and displays the received data waveform. The resulting overlay of multiple traces on the oscilloscope produces a shape resembling a partially closed eye. The eye appears more closed when the data is distorted. Methods of combating inter-symbol interference include transmitter side pre-emphasis and receiver side linear equalization and/or DFE. Each of these methods can be either programmed or made adaptive. Thus, the data eye will appear more open when transmission is improved.

DCD is a deviation in duty-cycle value from the ideal (e.g., intended) value or the difference in propagation delay between low to high and high to low delay times. This deviation is both the variance in timing away from an ideal duty cycle (e.g., 50%) and also the variance in average voltage offset. DCD is generally generated within a SerDes device due to an imbalance in drive circuit bias levels. In many serial data systems DCD equates to a deviation in bit time between a 1 bit and a 0 bit. The source of DCD is commonly timing differences between rising and falling edges within a system, but may also be caused by ground shifts in single ended systems.

DDJ also comprises jitter introduced into a serial link via active components. In a fiber optic network, active components include optical amplifiers, couplers, repeaters, etc. These components can actively shape the transmitted waveform, thus introducing additional DDJ.

Both ISI and DCD jitter have significant impact on the performance of a SerDes device since they both serve to reduce the vertical and horizontal openings of a data eye. The vertical dimension of the data eye is referred to as the signal amplitude, measured in millivolts. The horizontal dimension of the data eye is referred to as the signal period and is measured in picoseconds.

Conventional methods of jitter compensation include equalization. At the transmit side, equalization techniques used generally include transmitter pre-emphasis (TXPE) or de-emphasis. TXPE boosts the signal amplitude at the transitions, thus compensating the channel attenuation at high frequencies. Alternatively, lower frequencies may be attenuated (e.g., de-emphasis). For simplicity, any method of transmitter boosting, attenuation, pre-emphasis, or de-emphasis is referred to herein as pre-emphasis.

To achieve extra headroom, a large supply voltage for the transmitter output buffer is required. This leads to increased power consumption. Further, large signal swings also create voltage and current ripples and work as crosstalk aggressors. This gives rise to increased near end crosstalk (NEXT) and/or far end crosstalk (FEXT). In order to restrict crosstalk impact, the transmitted signal dynamic range is limited. As most receivers have some equalization mechanism built-in, it tends to boost the crosstalk energy while boosting the signal energy at high frequency, thus degrading the received signal integrity.

Additionally, TXPE provides only limited DDJ compensation. Since most of the TXPE is focused on data amplitude compensation, the horizontal timing of data pulses is not directly dealt with. This may be seen in optical systems in which active components reshape the pulse waveform.

Other methods of jitter compensation use clock delay elements to control clock edges and data signal transitions. These clock delay elements are difficult to match and are difficult to control over process, temperature, and voltage.

Accordingly, a more comprehensive approach to jitter management is required.

BRIEF SUMMARY OF THE INVENTION

The present invention provides methods and apparatus for reducing jitter in serial transmissions. To reduce jitter, the duty cycle and amplitude of a signal are modified. The modification may include modulating the leading and trailing edges of a data pulse (e.g., a signaling bit of the signal) as well as leading and/or trailing edges of preceding and/or succeeding data pulses. Data control signals based on the modulated signals are sent to clock and data buffers to modulate the transmission and improve signal transmission.

The signaling bit and/or other bits may be modulated using a multi-dimensional (e.g., a two-dimensional) modulation circuit. The modulation circuit includes a data dependency controller which modulates the pulse width of the signal. The modulation circuit also includes a circuit to modulate the amplitude of the signal. In this way, both the width and height of the data signal may be modulated and the transmission may be improved.

These and other advantages of the invention will be apparent to those of ordinary skill in the art by reference to the following detailed description and the accompanying drawings.

BRIEF DESCRIPTION OF THE DRAWINGS

FIG. 5 depicts a look-up table of a leading group of bits according to an embodiment of the present invention;

FIG. 6 depicts a look-up table of a second leading group of bits according to an embodiment of the present invention;

FIG. 7 depicts a look-up table of a trailing group of bits according to an embodiment of the present invention;

FIG. 8 depicts a look-up table of a second trailing group of bits according to an embodiment of the present invention;

FIG. 9 depicts a look-up table of a leading group of bits according to an embodiment of the present invention;

FIG. 10 depicts a look-up table of a trailing group of bits according to an embodiment of the present invention;

DETAILED DESCRIPTION

The present invention relates generally to transmitter improvement and more particularly to duty cycle pre-distortion and two-dimensional modulation. Two-dimensional modulation incorporates an amplitude pre-emphasis scheme as well as a transmit duty cycle pre-distortion (pre-DCD) technique.

The inventive pre-DCD methods and circuits directly address transition edges of the data signal. Accordingly, it is a more efficient method of dealing with pulse width modulation (PWM) effects, especially PWM effects derived from optical systems. The pre-DCD method also reduces voltage and/or current swings. This minimizes strains on the power supply and reduces undesirable crosstalk effects.

Further, the present two-dimensional modulation method can use a TXPE circuit to approximate the inverse characteristics of the transmit data path. The two dimensional modulation may be configured to provide a filtering profile, $F_{TX}(f)$, mimicking the inverse of a channel profile, $F_{Chan}(f)$, through which the signal is transmitted. $F_{TX}(f) \approx k * 1/F_{Chan}(f)$, where k is usually a constant factor less than 1. Thus, $F_{TX}(f)*F_{Chan}(f) \approx k$, implying independence of f (e.g., frequency). Thus, the channel is equalized.

This provides a more efficient and cost effective SerDes device for reliable data communications. That is, the present two-dimensional modulation method is more efficient and cost effective because it is achieved common circuit blocks without the large launch amplitude requirement when only amplitude modulation (e.g., TXPE) is used. This, in turn, helps reduce the energy at the transmitter launch, reducing power consumption and the impact of the transmit channel on all neighboring channels.

Figure 1:
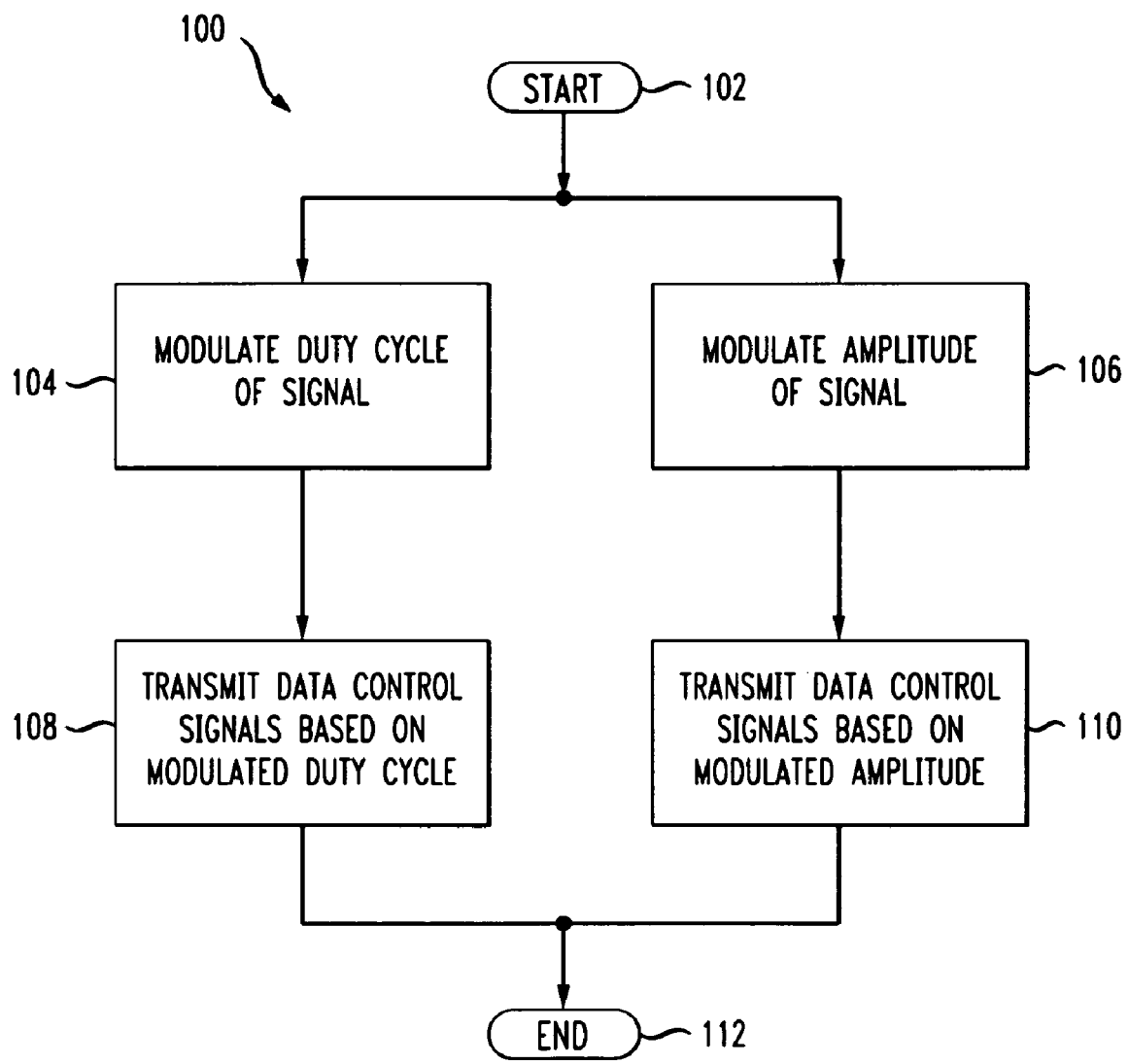
FIG. 1 is a flowchart of a method of reducing data dependent jitter according to an embodiment of the present invention.

FIG. 1 is a flowchart of a method 100 of reducing DDJ according to an embodiment of the present invention. The method 100 begins at step 102. The method 100 of FIG. 1 may be performed by any appropriate combination of circuitry. In an exemplary embodiment, the method steps of method 100 may be performed by the DCD circuit 200 of FIG. 2 which is described in further detail below.

At step 104, the duty cycle (e.g., the pulse width) of a signal is modulated. Clock DCD is attributed primarily to asymmetry of clock duty cycles. In the case of a multi-phased clock, clock DCD occurs when the phase separation (e.g., spacing) is non-linear. Jitter from clock DCD is passed on to serial data when distorted clocks are used to serialize a parallel input signal.

The signal may be a clock signal or may be a transmission signal and may be modulated by the circuits described below, especially with respect to FIGS. 2-4. The signal may be modulated dynamically such that each data signal edge undergoes modulation. Such a modulation scheme may utilize look-up tables to modulate the data pulse edges based on the current signal edges (e.g., the leading and/or the trailing edges) and/or the leading edge of a trailing signal and/or the trailing edge of a leading signal. In other embodiments, a modulation may be determined to apply to all signal edges from a transmitter based on a single waveform, a group of waveforms, and/or a sampling of signals. As such, DCD from a clock source is modulated (e.g., calibrated) in step 104.

In step 106, the amplitude of the signal is modulated. That is, the DCD from a data source is modulated (e.g., calibrated). Modulation of the amplitude of the signal may include amplitude (e.g., transmitter) pre-emphasis. Such pre-emphasis may be performed according to known methods as described above and in detail below with respect to element 210 of FIG. 2 or may be performed in connection with the multi-dimensional modulation of multi-dimensional modulation module 206 of FIG. 2.

Figure 2:
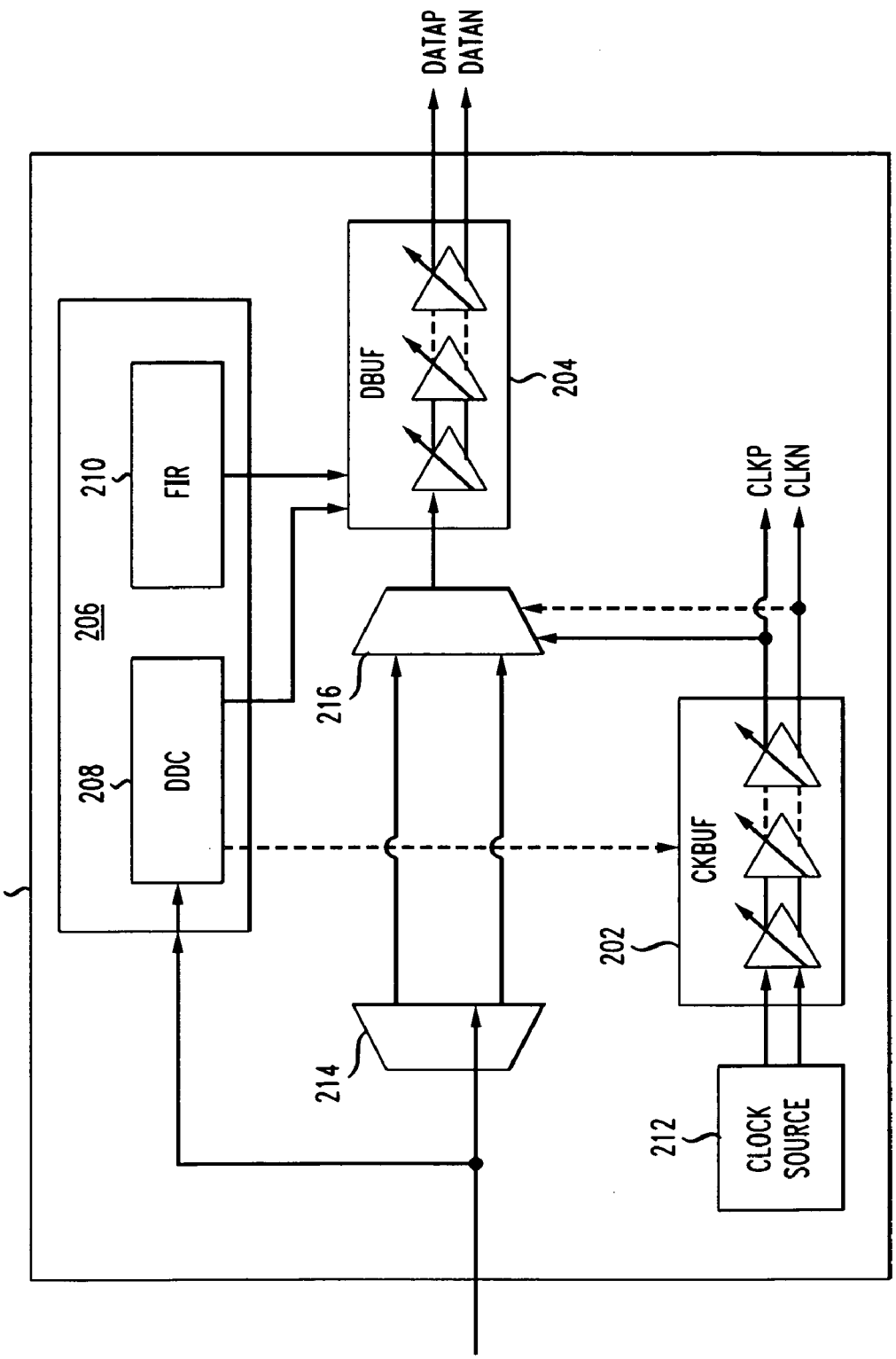
FIG. 2 is a block diagram of a circuit according to an embodiment of the present invention.

In step 108, data control signals based on the modulated duty cycle of the signal are transmitted to a clock buffer such as CKBUF 202 of FIG. 2. In step 110, data control signals based on the modulated amplitude of the signal are transmitted to a data buffer such as DBUF 204 of FIG. 2. It may be understood that steps 108 and 110 may be performed substantially (e.g., approximately) simultaneously and/or separately. That is, in practical use, steps 108 and 110 may be performed at about the same time. Further, the data control signals of steps 108 and 110, referred to more specifically below with respect to FIG. 2, may be transmitted to any appropriate module and/or circuit for signal processing.

Further, steps 104 and 106 may be performed substantially (e.g., approximately) simultaneously and/or in concert with each other. That is, a data signal may be processed according to method steps 104 and 106 in series or in parallel (e.g., at about the same time) and may produce data control signals as indicated in method steps 108 and 110 and with reference to DDC 208 sending control signals to CKBUF 204 and DBUF 204 and amplitude pre-emphasizer 210 sending control signals to DBUF 204 as described below with respect to FIG. 2. Further, as described herein, method steps 108 and 110 may be performed in series, alone, or in concert (e.g., in parallel). That is, method step 108 (DCD-only) may be performed, method step 110 (amplitude pre-emphasis) may be performed, or both steps (two-dimensional modulation) may be performed concurrently.

The method ends at step 112.

FIG. 2 is a block diagram of a circuit 200 according to an embodiment of the present invention. Circuit 200 may be a circuit for perform trimming, correction, and generation of DCD, herein referred to as DCD circuit 200. DCD circuit 200 comprises a programmable threshold clock buffer module (CKBUF) 202, a programmable threshold data buffer module (DBUF) 204, and a multi-dimensional modulation module 206 coupled (e.g., via control signals) to CKBUF 202 and/or DBUF 204.

Multi-dimensional modulation module 206 may be a circuit and/or may comprise a data dependency controller (DDC) 208 and/or an amplitude pre-emphasizer 210. DDC 208 may be configurable to send clock DCD control signals to CKBUF 202 and/or data DCD control signals to DBUF 204. Similarly, amplitude pre-emphasizer 210 may be configurable to send data amplitude PE to DBUF 204. In at least one embodiment multi-dimensional modulation module 206 may have a DDC 208 without an amplitude pre-emphasizer 210 and/or may import (e.g., receive) an amplitude pre-emphasis signal from another source.

DCD circuit 200 may further comprise a clock source 212 to send one or more clock signals to CKBUF 202, a parallel transmission data divider 214 to receive parallel transmission data, divide the transmission data into even data and odd data streams, and pass the divided transmission data to a data multiplexer 216. In turn, the multiplexer 216 may pass transmission data to the DBUF 204.

In some embodiments, parallel transmission data may be N-bit wide (e.g., N=20, 16, 10, etc.). The data are divided into odd and even groups through several stages of multiplexing. The final stage of multiplexing takes odd data, even data, odd data, even data, etc. alternatively. This may be triggered by, for example, the rising edge, the falling edge of the clock, the rising edge of the clock, the falling edge of the clock, etc.

In other embodiments, the data may be further divided (e.g., by divider 214) into 4i, 4i+1, 4i+2, and 4i+3 bins and use a four phased clock to drive the data out. Generally, the numbers of bins are an even number (e.g., 2, 4, 8, etc.), though they may be of an odd number. The bins are driven out by the same number of evenly spaced clocks. An advantage of such an arrangement is that the frequencies of the phase clocks is lowered and only one edge may used (e.g., the rising edge), though other arrangements may also and/or alternatively be used.

CKBUF 202 may have a configurable (e.g., programmable) delay threshold. CKBUF 202 may be a single buffer or may comprise multiple buffers (e.g., in a buffer chain). In embodiments in which a series of CKBUFs 202 are employed, each buffer may have an individual control or may share a common control of all of the buffers.

In at least one embodiment, CKBUF 202 may be a differential clock buffer. In other embodiments, CKBUF 202 may be a single-ended clock buffer and/or a multi-phase multi-data clock buffer.

CKBUF 202 may pass buffered clock signals (e.g., positive (CLKP) and complimentary (CLKN) in the case of a differential CKBUF 202) to the data multiplexer 216. As such, CKBUF 202 may be capable of shifting the time domain of data signals passing through data multiplexer 216.

DBUF 204 may have a configurable (e.g., programmable) slew rate threshold. Similarly to CKBUF 202, DBUF 204 may be a single buffer or may comprise multiple buffers. In embodiments in which a series of DBUFs 204 are employed, each buffer may have an individual control or may share a common control of all of the buffers. In at least one embodiment, DBUF 204 may be a differential data buffer. In other embodiments, DBUF 204 may be a single-ended data buffer and/or a multi-phase multi-data data buffer.

DBUF 204 may receive pre-DCD signals from the DDC 208 and/or the amplitude pre-emphasizer 210 (e.g., data DCD control signals and data amplitude PE, respectively). DBUF 204 may also receive the multiplexed and time-shifted data signals from data multiplexer 216. As such, DBUF 204 may be capable of shifting the time domain and/or amplitude of a data signal, thus performing duty cycle pre-distortion to address the transition edges of the data signal and reduced jitter.

DDC 208 may be a pre-DCD circuit and may scan past, current, and/or future signal bits and determine one or more threshold settings for the CKBUF 202 and/or the DBUF 204. That is, DDC 208 may determine one or more delays for the CKBUF 202 and/or one or more slew rates for the DBUF 204. Further capabilities of DDC 208 may be understood with reference to exemplary DDC circuits in FIGS. 3 and 4 and look-up tables in FIGS. 5-10 as described below.

DDC 208 may comprise one or more delay elements, look-up table circuits, and/or adders. In the exemplary embodiments of FIGS. 3 and 4, DCD controls may be a multi-bit digital word. In the same or other embodiments of DDC 208, DCD controls may be an analog input (e.g., voltage and/or current) or may be a combination of digital and analog input signals.

Amplitude pre-emphasizer 210 may comprise circuitry to modify the amplitude of a data signal as is known. In at least one embodiment, amplitude pre-emphasizer 210 may be a filter, such as a finite impulse response (FIR) filter. Other filters or methods of pre-emphasis may be used.

Amplitude pre-emphasizer 210 may work by performing digital mathematical operations on an intermediate form of a signal. In at least one embodiment, amplitude pre-emphasizer 210 may be algorithm controlled; that is, it may be controlled using one or more look-up tables, similar to those discussed below with respect to DDC 208.

Clock source 212 may be a clock capable of generating a clock signal to coordinate the actions of a circuit. The clock signal may oscillate between a high and a low state and may instigate DCD circuit to become active at either the rising or falling edge, or both, of the clock signal. In the same or alternative embodiments, clock source 212 may be derived from a phase-locked loop (PLL). Thus, the clock source 212 may be an electronic control system that generates a signal that is locked to the phase of an input or reference signal. In this way, the clock source 212 may compare the phase of a controlled oscillator to the reference, automatically raising or lowering the frequency of the oscillator until its phase is matched to that of the reference.

Divider 214 and multiplexer 216 may be data demultiplexers and/or multiplexers and/or dividers and/or combiners as is known. That is, divider 214 may receive parallel transmission data as a single input and demultiplex and/or divide the data signal into even data and odd data signals. Similarly, the multiplexer 216 may received the even and odd data signals from the divider 214 and the buffered clock signals from CKBUF 202 and may multiplex and/or combine the transmission data accordingly.

Figure 3:
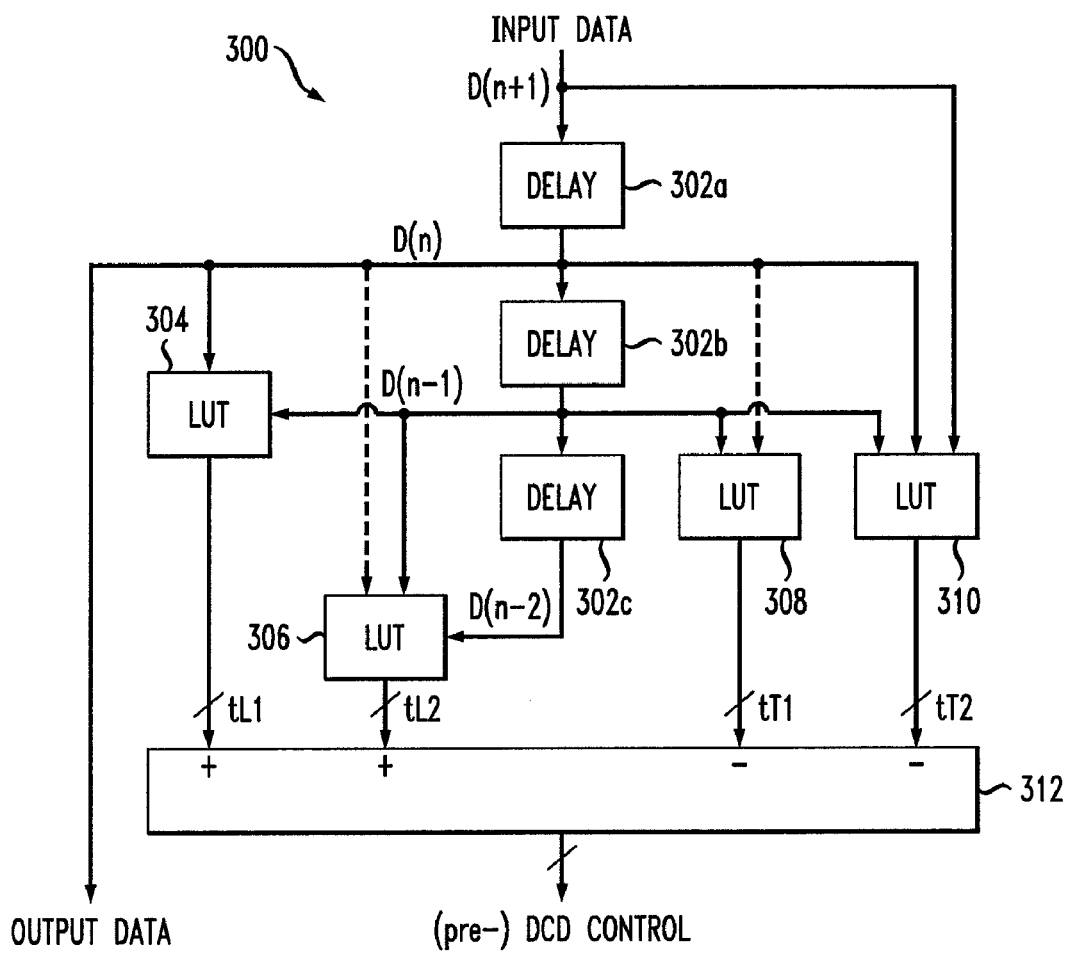
FIG. 3 depicts an exemplary data dependency controller according to an embodiment of the present invention.

FIG. 3 depicts an exemplary data dependency controller 300 according to an embodiment of the present invention. DDC 300 may be used in DCD circuit 200 above as DDC 208 or may be used in another circuit. DDC circuit 300 may be a data propagation DDC circuit and may comprise any number (e.g., three, etc.) of delay elements 302a, 302b, and 302c which may be connected in series, as shown in FIG. 3, or may be arranged in another manner.

DDC 300 may further comprise multiple (e.g., four, etc.) look-up table (LUT) circuits 304, 306, 308, and 310. LUT circuits 304-306 may correspond to the look-up tables containing edge control information depicted in FIGS. 5, 6, 7, and 8, respectively, as discussed below.

Input data may be fed to delay 302a (and to LUT circuit 310) and subsequently through delays 302b-c and LUT circuits 304-310 as appropriate. The results of LUT circuits 304-310 may be added at a multiple input adder 312. Adder 312 may output a DCD data control signal to be sent to DBUF 204 of FIG. 2. Further discussion of the particular functions of LUT circuits 304-310 and their use in DDC 300 is included below with respect to FIGS. 5-8.

Figure 4:
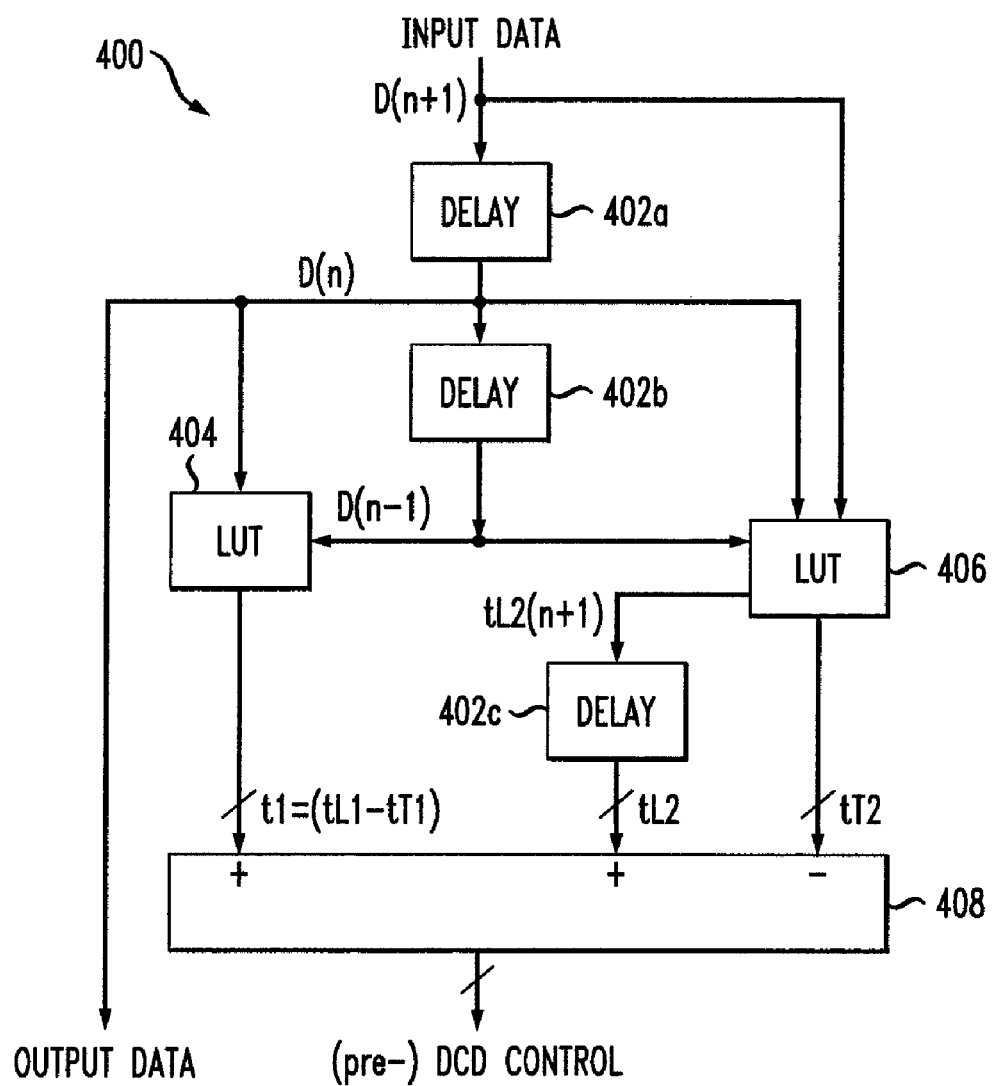
FIG. 4 depicts an exemplary data dependency controller according to an embodiment of the present invention.

FIG. 4 depicts an exemplary data dependency controller 400 according to an embodiment of the present invention. DDC 400 may be used in DCD circuit 200 above as DDC 208 or may be used in another circuit. DDC circuit 400 may be a data propagation DDC circuit and may comprise any number (e.g., three, etc.) of delay elements 402a, 402b, and 402c which may be arranged in any manner.

DDC 400 may further comprise multiple (e.g., two, etc.) look-up table (LUT) circuits 404 and 406. LUT circuits 404-406 may correspond to the look-up tables containing edge control information depicted in FIGS. 9 and 10, respectively, as discussed below.

Input data may be fed to delay 402a and LUT circuit 406 and subsequently through delay 402b and delay 402c, respectively, and/or through LUT circuits 104 and 406 as appropriate. The results of LUT circuits 404 and 406 may be added at a multiple input adder 408. Adder 408 may output a DCD data control signal to be sent to DBUF 204 of FIG. 2. Further discussion of the particular functions of LUT circuits 404 and 406 and their use in DDC 400 is included below with respect to FIGS. 9 and 10.

In operation, DDC 300 may be used to provide a pre-DCD control signal in DCD circuit 200. Input data (e.g., parallel transmission data) may be fed into DDC 300 as a series of data pulses (e.g., bits) with a trailing (e.g., falling) edge of one pulse being the leading (e.g., rising) edge of a following pulse. Therefore, any pulse edge may be influenced by the signal itself plus the preceding and/or following data. In the exemplary embodiment of FIGS. 3 and 5-8, a five bit pattern is shown to determine an appropriate pre-DCD to be applied (e.g., at DBUF 204 in FIG. 2). The five bits include two preceding bits, a signaling bit, and two succeeding bits. It is noted that the five bit pattern and examples described in relation to FIGS. 3 and 5-8 are presented to illustrate the present invention are non-limiting. Any number of bits (e.g., more bits, less bits, no bits, etc.) and/or arrangement (e.g., asymmetrical bits, etc.) may be used.

FIG. 5 depicts a look-up table 500 of a leading group of bits related to look-up table circuit 304 of FIG. 3 according to an embodiment of the present invention. Similarly, FIG. 6 depicts a look-up table 600 of a second leading group of bits related to look-up table circuit 306 of FIG. 3; FIG. 7 depicts a look-up table 700 of a trailing group of bits related to look-up table circuit 308 of FIG. 3; and FIG. 8 depicts a look-up table 800 of a second trailing group of bits related to look-up table circuit 310 of FIG. 3.

In FIGS. 5-8, data are labeled with positive indexed bits as succeeding bits and negative indexed bits as preceding bits. For example, data may be labeled as D(−2) (e.g., a leading bit), D(−1) (e.g., a leading bit), D(0) (e.g., the signaling bit), D(1) (e.g., a trailing bit), D(2) (e.g., a trailing bit). Data may be further grouped into leading groups (e.g., groups consisting of all preceding bits and the signaling bit) and trailing groups (e.g., groups consisting of all succeeding bits and the signaling bit).

Leading groups may influence the leading edge of the signaling bit and may be continuously divided according to the farthest bit position with respect to the signaling bit. In the example of FIGS. 3 and 5, a first leading group L1 is described as {D(−1), D(0)}. Similarly, in the example of FIGS. 3 and 6, a second leading group L2 is described as {D(−2), D(−1), D(0)}.

Trailing groups may influence the trailing edge of the signaling bit and may be formed similarly to leading groups L1 and L2 of FIGS. 5 and 6, respectively, as in trailing groups T1 and T2 of FIGS. 7 and 8, respectively. It may be seen that the leading edge of D(0) is also the trailing edge of D(−1). As such, the leading edge of D(0) is determined by leading groups of D(0) (e.g., L1 and L2) and trailing groups of D(−1) (e.g., T2).

In the simplified code tables of FIGS. 5-8, signals tL1, tL2, tT1, and tT2 may be pre-calibrated controls. They may be combined together (e.g., via adder 312 of FIG. 3) as tL(n)= tL1(n)+tL2(n)−tT1(n−1)−tT2(n−1), thus generating digital timing controls (e.g., signals for pre-DCD) for CKBUF 202 and DBUF 204 of FIG. 2. In such a case, positive tL(n) values indicate edge expansion and negative tL(n) values indicate edge shrinkage. If timing controls are used in the opposite direction, they will generated and inject DCD into the serial data, thus becoming a jitter model and generator and can be used in ATE testing and lab characterization.

In this way, the circuits described herein may be reused. Initially, the circuit (e.g., DDC 300 and/or DDC 400) is used to trim the buffers so that non-ideal settings are calibrated. The trimming information is saved when the device is powered up. At a subsequent device power-up, this process repeats, and/or the trimming may be forced whenever necessary.

The trimming information may be used in a number of ways. First, if no time-axis modulation is needed, a table is consulted to deliver a close-to-0 DCD from CKBUF (e.g., CKBUF 202) and DBUF (e.g., DBUF 204) DCD induced jitter is removed. Second, if time-axis modulation is enabled, a table is searched to provide settings depending on the amount of modulation. This will seek to equalize the channel and remove a certain amount of ISI. Third, in ATE (e.g., for production testing) an undesirable amount of DCD may be purposely created such that the signal reaching the receiver is deteriorated. If the receiver can work with this signal, this device will be regarded as a "pass".

In operation, DDC 400 of FIG. 4 may be used similarly to DDC 300 of FIG. 3 to provide a pre-DCD control signal in DCD circuit 200. FIG. 9 depicts a look-up table 900 of a leading group of bits related to look-up table circuit 404 of FIG. 4 according to an embodiment of the present invention. Similarly, FIG. 10 depicts a look-up table 1000 of a trailing group of bits related to look-up table circuit 406 of FIG. 4.

In FIGS. 9 and 10, data are labeled with positive indexed bits as succeeding bits and negative indexed bits as preceding bits. Data may be further grouped into leading groups and trailing groups. In the example of FIGS. 4 and 9, a first leading group L1 is described as {D(−1), D(0)}. As described herein, L refers to a leading edge and T refers to a trailing edge. In the case of L1, T1, etc., 1 refers to a 1-bit effect (e.g., a first order approximation). Similarly, L2 refers to a leading edge with 2-bit effect (e.g., a second order approximation). Accordingly, L1 is controlled by {D(−1),D(0)} and L2 is controlled by two preceding bits and the signaling bit, {D(−2),D(−1),D(0)}, as in FIG. 6. Further, T1 is {D(0),D(1)} and T2 is {D(0),D(1),D(2)} as in FIGS. 7 and 8 respectively.

In such embodiments, a first order approximation gives an effective approximation of width modulation, while a second order approximation refines the first order approximation, and each succeeding approximation refines its preceding approximation. Thus, a greater number of preceding and succeeding bits will yield ever-closer tuning ability. Though described herein as a 1-bit and a 2-bit effect, it is understood that this may be expanded to $L_n$ and $T_m$ systems. That is, for leading edges, the previous n bits may be used and the next m bits may be used for trailing edges.

In the simplified code tables of FIGS. 9 and 10, signals tL1, tL2, tT1, tT2, and t1 may be pre-calibrated controls where t1=tL1−tT1 as shown in FIG. 4. They may be combined together (e.g., via adder 408 of FIG. 4) as tL(n)=t1(n)+tL2(n)−tT2(n−1), thus generating digital timing controls (e.g., signals for pre-DCD) for CKBUF 202 and DBUF 204 of FIG. 2.

Further, the leading edge of a signal may be the trailing edge of preceding data signal (e.g., pulse) and the trailing edge of the signal may be the leading edge of next signal. Accordingly, the L1 group table (FIG. 5) and T1 group table (FIG. 6) may be merged into the LT1 group table (FIG. 9).

The simplified DDC 400 of FIG. 4 may provide a more efficient solution than DDC 300 of FIG. 3 though any other appropriate implementation of data dependency controllers and/or look-up tables may be used besides the examples of FIGS. 3-10.

FIGS. 11-14 depict graphical representations (e.g., as on an oscilloscope) of data transmissions and the data eye after a backplane according to prior art methods (in FIGS. 11 and 12) and implementing various embodiments of the present invention (in FIGS. 13 and 14) to illustrate the benefits of embodiments of the present invention. The data transmissions in FIGS. 11-14 illustrate transmission and reception using a SerDes transmitter sending a pseudorandom binary sequence pattern.

Figure 11:
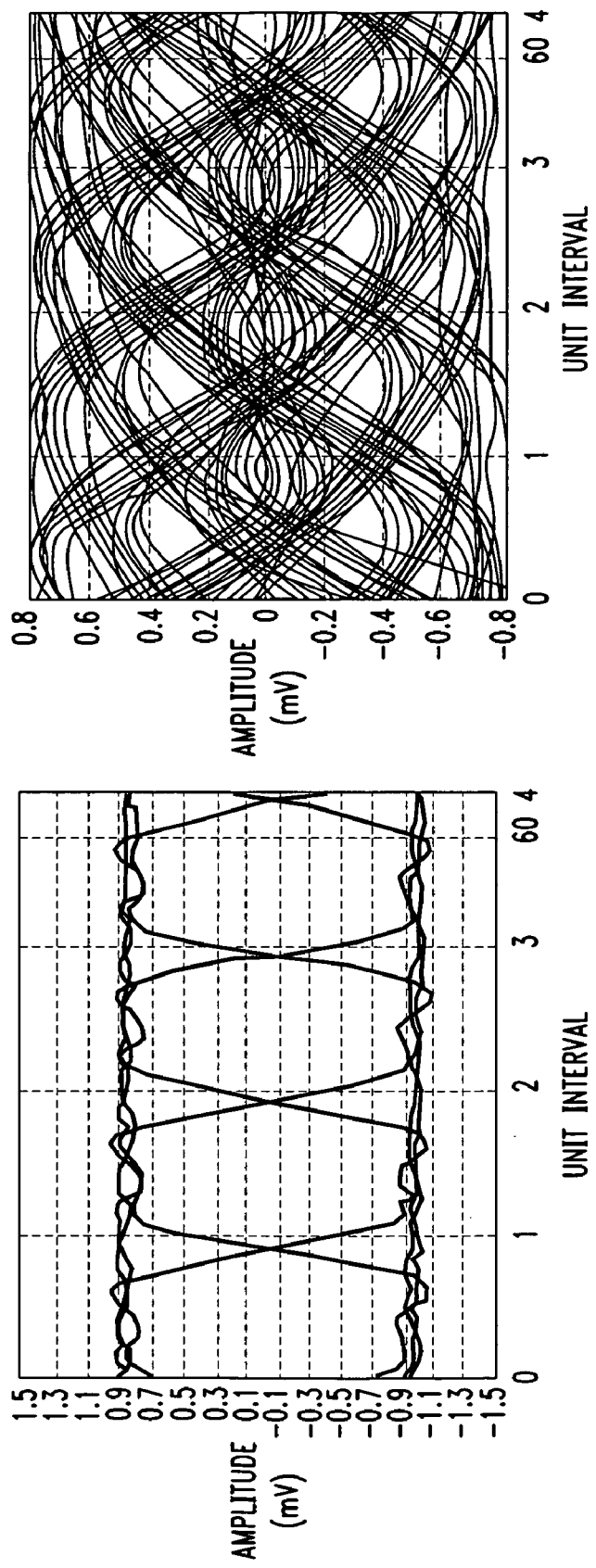
FIG. 11 depicts the SerDes transmitter sending data without any pre-equalization and the data eye after a backplane.

FIG. 11 depicts the SerDes transmitter sending data without any pre-equalization (e.g., pre-DCD) and the data eye after a backplane. In such a case, a receiver must have a strong equalization function to ensure its clock data recovery circuit functions properly. Receiver decision feedback equalization is used to remove and/or reduce channel post-cursor effects. As seen in FIG. 11, using only receiver decision feedback equalization boosts high frequency noise and crosstalk. This may be seen as there is no discernable data eye at the receiver end. Accordingly, the total serial link performance is degraded.

Figure 12:
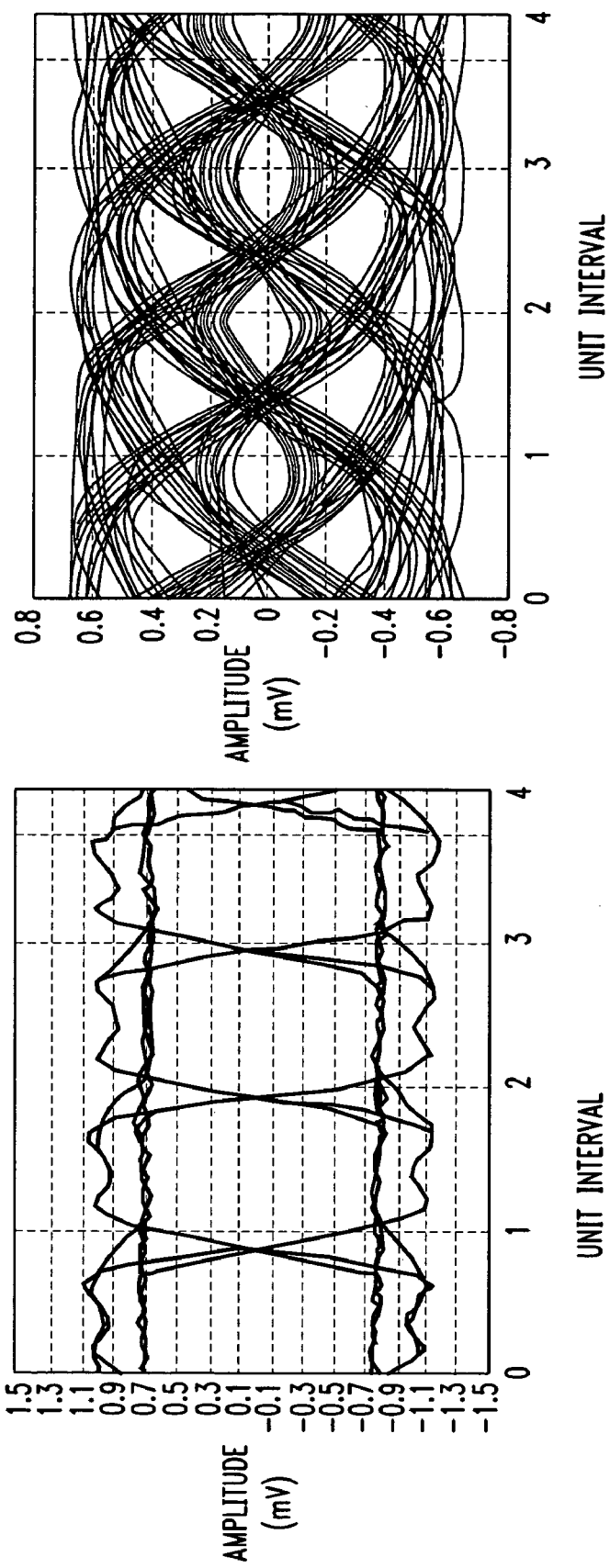
FIG. 12 depicts the SerDes transmitter using conventional amplitude-only FIR pre-emphasis and the data eye after a backplane.

FIG. 12 depicts the SerDes transmitter using conventional amplitude-only FIR pre-emphasis and the data eye after a backplane. As seen in FIG. 12, the amplitude of the data signal is boosted, distorting the data eye at the transmitter but opening it at the receiver. In conventional implementations such as this, the transmitter must transmit more than the usual signal amplitude to maintain low frequency content at a minimum level. This requires extra headroom as described above and complicates circuit design. Further, to transmit the additional signal amplitude, increased supply voltage is required leading to increased power consumption. Still further, the large signal output serves as a severe crosstalk aggressor to increase both NEXT and FEXT. Even further, this limits the total signal amplitude after a lossy backplane because the boosted high frequency energy is mostly attenuated. As a result, the signal dynamic range is limited, which inhibits decision-feedback receiver equalization. Thus, high gain and large high frequency boosting power of an analog receiver equalization is difficult without using a large silicon size and/or consuming significant power.

Figure 13:
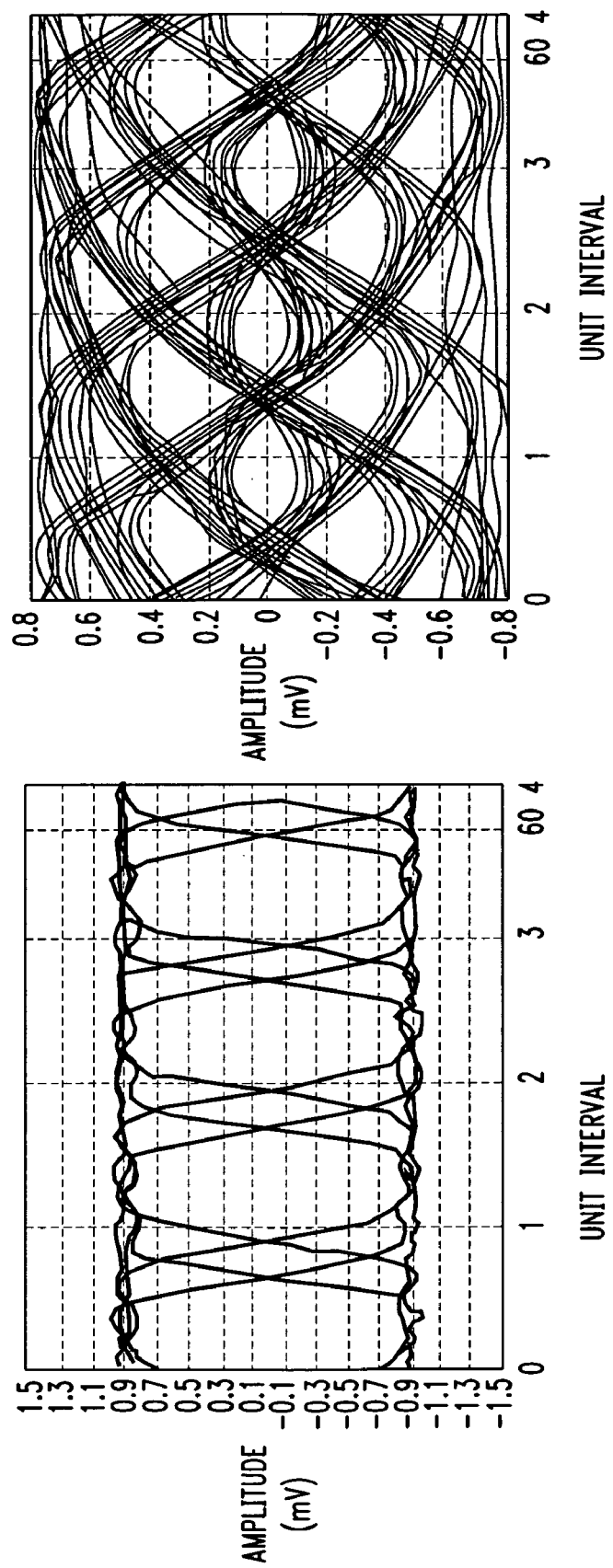
FIG. 13 depicts the SerDes transmitter and the data eye after a backplane utilizing the pre-DCD of the present invention.

FIG. 13 depicts the SerDes transmitter and the data eye after a backplane utilizing the pre-DCD of the present invention according to FIGS. 1-10, especially FIGS. 3-10. As in the amplitude pre-emphasis method shown in FIG. 12, the data eye at the transmitter is distorted, but opens at the receiver. The pre-DCD methods and circuits do not transmit a larger signal than necessary, thus decreasing power consumption. Further, as seen here, the inventive pre-DCD methods and circuits alleviate the stringent design requirements described above with respect to FIG. 12 and do not increase NEXT and FEXT. Still further, the received signal has the increased amplitude necessary for good decision-feedback receiver equalization performance.

Figure 14:
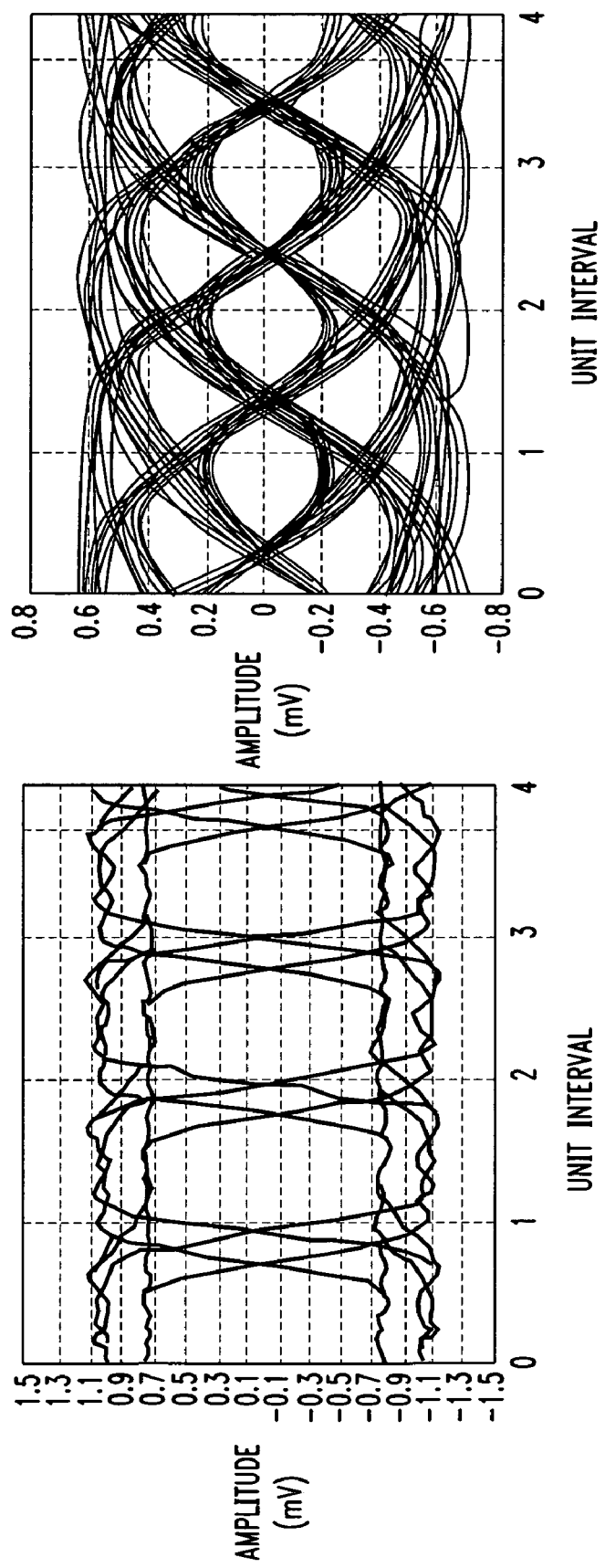
FIG. 14 depicts the SerDes transmitter and the data eye after a backplane utilizing the multi-dimensional modulation circuits and methods according to an embodiment of the present invention.

FIG. 14 depicts the SerDes transmitter and the data eye after a backplane utilizing the pre-DCD circuits and methods as well as the multi-dimensional modulation circuits and methods described in FIGS. 1 and 2. That is, both amplitude TXPE and pre-DCD are employed according to embodiments of the invention described herein. The amplitude TXPE and pre-DCD methods complement each other to achieve improved signal transmission and reception, as shown. This may be seen in the increased data eye in FIG. 14. The multi-dimensional modulation method combines the advantages of both the amplitude pre-emphasis shown in FIG. 12 and the pre-DCD shown in FIG. 13 to achieve greater equalization without increasing crosstalk or unnecessarily increasing power consumption.

Figure 15:
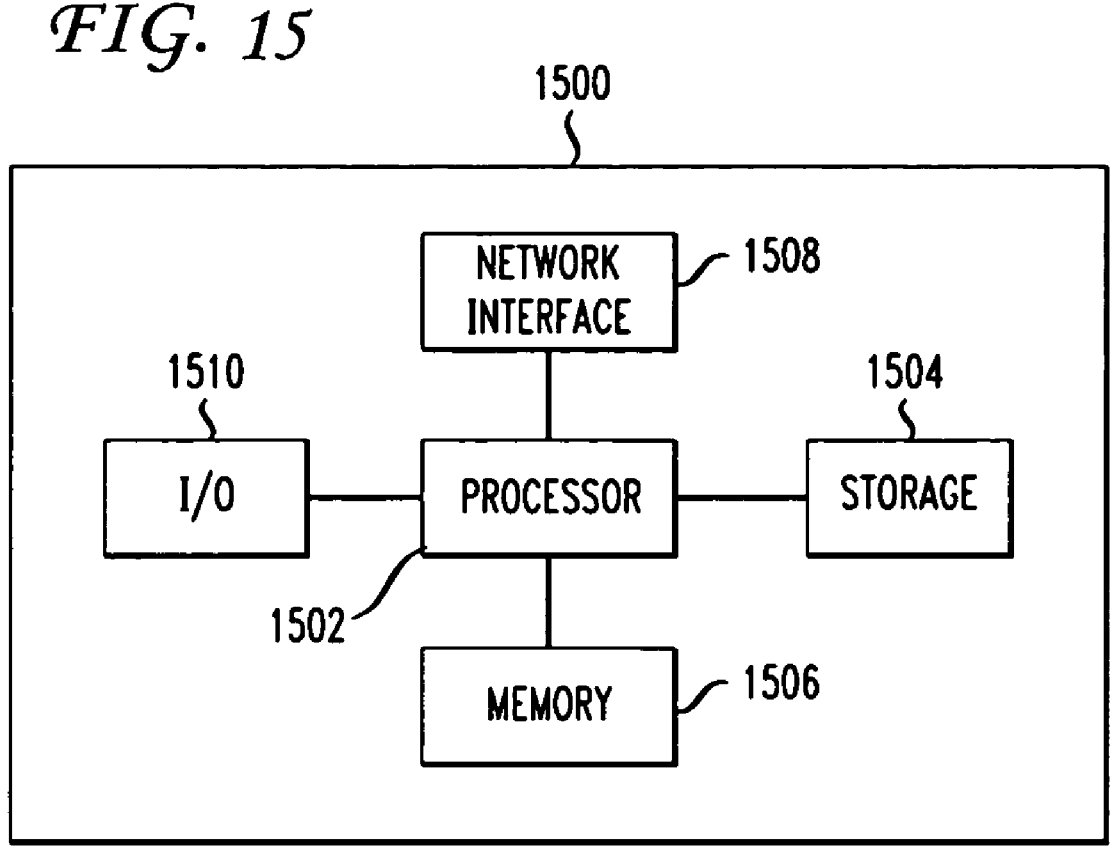
FIG. 15 is a schematic drawing of a computer according to an embodiment of the invention.

FIG. 15 is a schematic drawing of a computer 1500 according to an embodiment of the invention. One or more of the DDCs of FIGS. 3 and 4 and the DCD circuit 200 of FIG. 2 may be implemented on various components of computer 1500 as appropriate. Computer 1500 contains a processor 1502 which controls the overall operation of the computer 1500 by executing computer program instructions which define such operation. The computer program instructions may be stored in a storage device 1504 (e.g., magnetic disk, database, etc.) and loaded into memory 1506 when execution of the computer program instructions is desired. Thus, applications for performing the herein-described method steps, such as initiating transmission and/or conducting the various forms of pre-emphasis and/or pre-DCD, are defined by the computer program instructions stored in the memory 1506 and/or storage 1504 and controlled by the processor 1502 executing the computer program instructions. The computer 1500 also includes one or more network interfaces 1508 for communicating with other devices via a network. The computer 1500 also includes other input/output devices 1510 (e.g., display, keyboard, mouse, speakers, buttons, etc.) that enable user interaction with the computer 1500. One skilled in the art will recognize that an implementation of an actual controller could contain other components as well, and that the computer of FIG. 15 is a high level representation of some of the components of such a controller for illustrative purposes.

Further, the computer 1500 may be implemented on, may be coupled to, and/or may include any components or devices that are typically used by, or used in connection with, a computer or computer system. Computer 1500 and/or processor 1502 may include one or more central processing units, read only memory (ROM) devices and/or random access memory (RAM) devices.

According to some embodiments of the present invention, instructions of a program (e.g., controller software) may be read into memory 1506, such as from a ROM device to a RAM device or from a LAN adapter to a RAM device. Execution of sequences of the instructions in the program may cause the computer 1500 to perform one or more of the method steps described herein. In alternative embodiments, hard-wired circuitry, logic, or integrated circuits may be used in place of, or in combination with, software instructions for implementation of the processes of the present invention. Thus, embodiments of the present invention are not limited to any specific combination of hardware, firmware, and/or software. The memory 1506 may store the software for the computer 1500, which may be adapted to execute the software program and thereby operate in accordance with the present invention and particularly in accordance with the methods described in detail below. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled and/or encrypted format. The programs furthermore may include program elements that may be generally useful, such as an operating system, a database management system and device drivers for allowing the controller to interface with computer peripheral devices, and other equipment/components. Appropriate general purpose program elements are known to those skilled in the art, and need not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for serial transmission comprising:
   modulating a duty cycle of a signal; and
   modulating an amplitude of the signal wherein the duty cycle of the signal and the amplitude of the signal are modulated substantially simultaneously.

2. The method of claim 1 wherein modulating the duty cycle of the signal comprises:
   dynamically modulating a pulse width of the signal.

3. The method of claim 2 wherein dynamically modulating a pulse width of the signal comprises:
   modulating the pulse width based on a signaling bit of the signal and one or more preceding signaling bits.

4. The method of claim 2 wherein dynamically modulating a pulse width of the signal comprises:
   modulating the pulse width based on a signaling bit of the signal and one or more succeeding signaling bits.

5. The method of claim 4 wherein modulating the pulse width based on a signaling bit of the signal and one or more succeeding signaling bits further comprises:
   modulating the trailing edge of a bit succeeding the signaling bit.

6. The method of claim 3 wherein modulating the pulse width based on a signaling bit of the signal and one or more preceding signaling bits further comprises:
   modulating the leading edge of a bit succeeding the signaling bit.

7. The method of claim 1 wherein modulating the amplitude of the signal comprises:
   boosting the amplitude of the signal based on a look-up table.

8. The method of claim 1 wherein modulating the duty cycle of the signal comprises:
   modulating the edges of a signaling bit the signal based on timing signal information in a look-up table.

9. The method of claim 1 further comprising:
   transmitting to a clock buffer data control signals based on the modulation of the duty cycle of the signal; and
   transmitting to a data buffer data control signals based on the modulation of the amplitude of the signal.

10. A multi-dimensional modulation circuit comprising:
    a multi-dimensional modulation module comprising:
    a duty cycle pre-distortion circuit for modulating a duty cycle of a signal; and
    an amplitude pre-emphasizer for modulating an amplitude of the signal, wherein the duty cycle of the signal and the amplitude of the signal are modulated substantially simultaneously.

11. The multi-dimensional modulation circuit of claim 10 further comprising:
    a programmable threshold clock buffer module configured to buffer the delay of a clock signal; and
    a programmable threshold data buffer module configured to buffer the slew rate of a data signal.

12. The multi-dimensional modulation circuit of claim 11 further comprising:
    a clock source configured to send a clock signal to the clock buffer module;
    a demultiplexer configured to demultiplex an incoming transmission signal; and
    a multiplexer configured to multiplex the transmission signal from the demultiplexer with a clock signal from the clock buffer module and send the multiplexed signal to the data buffer module.

13. The circuit of claim 11 wherein the clock buffer module comprises a series of buffers.

14. The circuit of claim 11 wherein the data buffer module comprises a series of buffers.

15. A duty cycle pre-distortion circuit comprising:
    a plurality of delay elements configured to delay a data signal;
    a plurality of look-up table circuits comprising edge control information, wherein said plurality of look-up table circuits generate said edge control information within a sliding window of n serial data bits within said data signal and wherein said sliding window slides less than m bits per step, wherein m is less than a number of bits in an associated parallel data size; and
    an adder configured to receive said edge control information from the plurality of look-up table circuits and output a duty cycle pre-distortion signal.

16. An apparatus for serial transmission comprising:
   means for modulating a duty cycle of a signal; and
   means for modulating an amplitude of the signal, wherein the duty cycle of the signal and the amplitude of the signal are modulated substantially simultaneously.

17. The apparatus of claim 16 wherein the means for modulating the duty cycle of the signal comprises:
   means for dynamically modulating a pulse width of the signal.

18. The apparatus of claim 17 wherein the means for dynamically modulating a pulse width of the signal comprises:
   means for modulating a leading edge of a signaling bit of the signal;
   means for modulating a trailing edge of the signaling bit; and
   means for modulating a trailing edge of a bit preceding the signaling bit.

19. The apparatus of claim 18 further comprising:
   means for modulating the leading edge of a bit succeeding the signaling bit.

20. The apparatus of claim 16 wherein the means for modulating the amplitude of the signal comprises:
   means for boosting the amplitude of the signal based on a look-up table.

21. The apparatus of claim 16 wherein the means for modulating the duty cycle of the signal comprises:
   means for modulating the edges of a signaling bit the signal based on timing signal information in a look-up table.

22. The apparatus of claim 16 further comprising:
   means for transmitting to a clock buffer data control signals based on the modulation of the duty cycle of the signal; and
   means for transmitting to a data buffer data control signals based on the modulation of the amplitude of the signal.

* * * * *